United States Patent Office 3,086,634
Patented Apr. 23, 1963

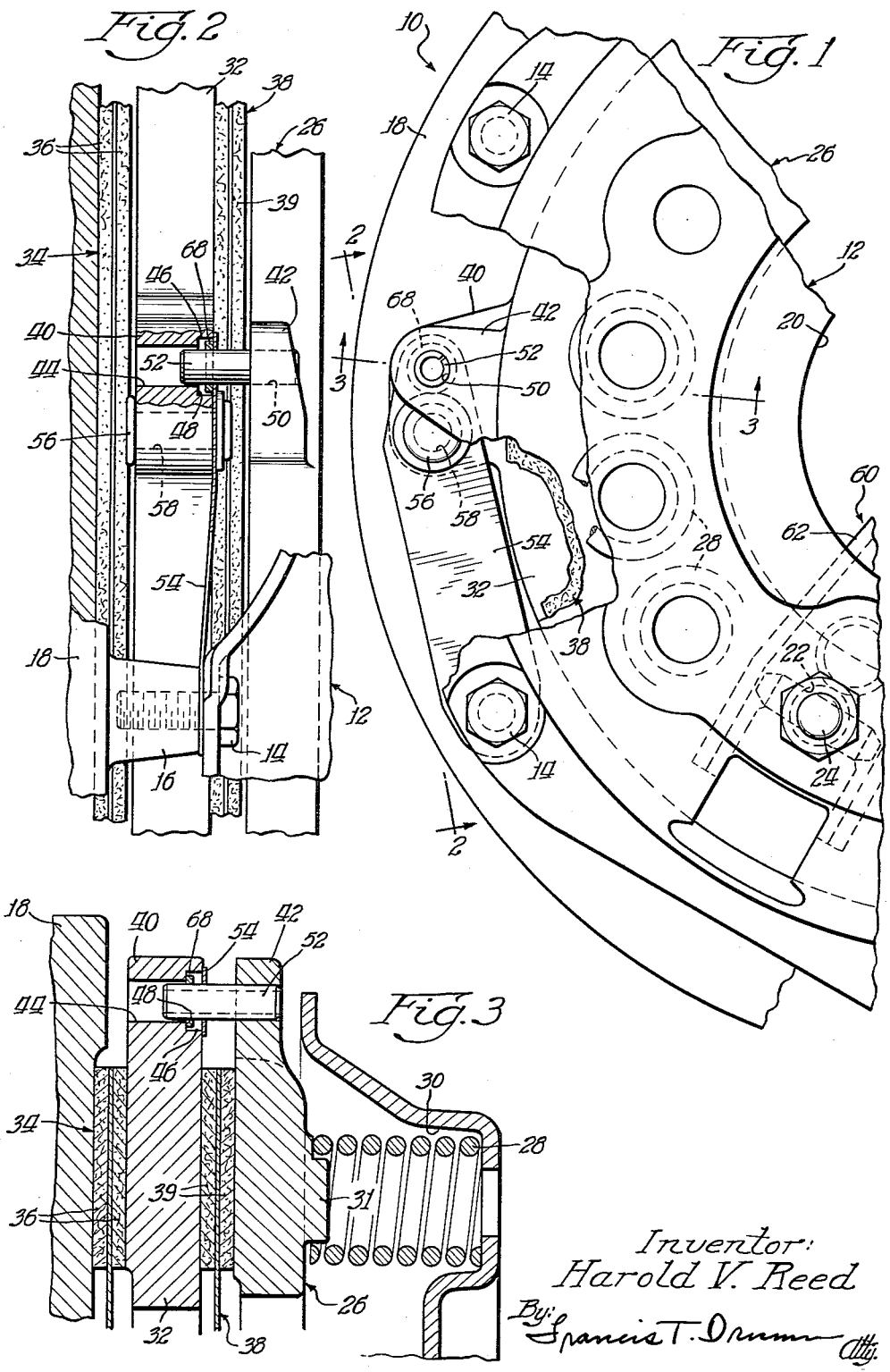

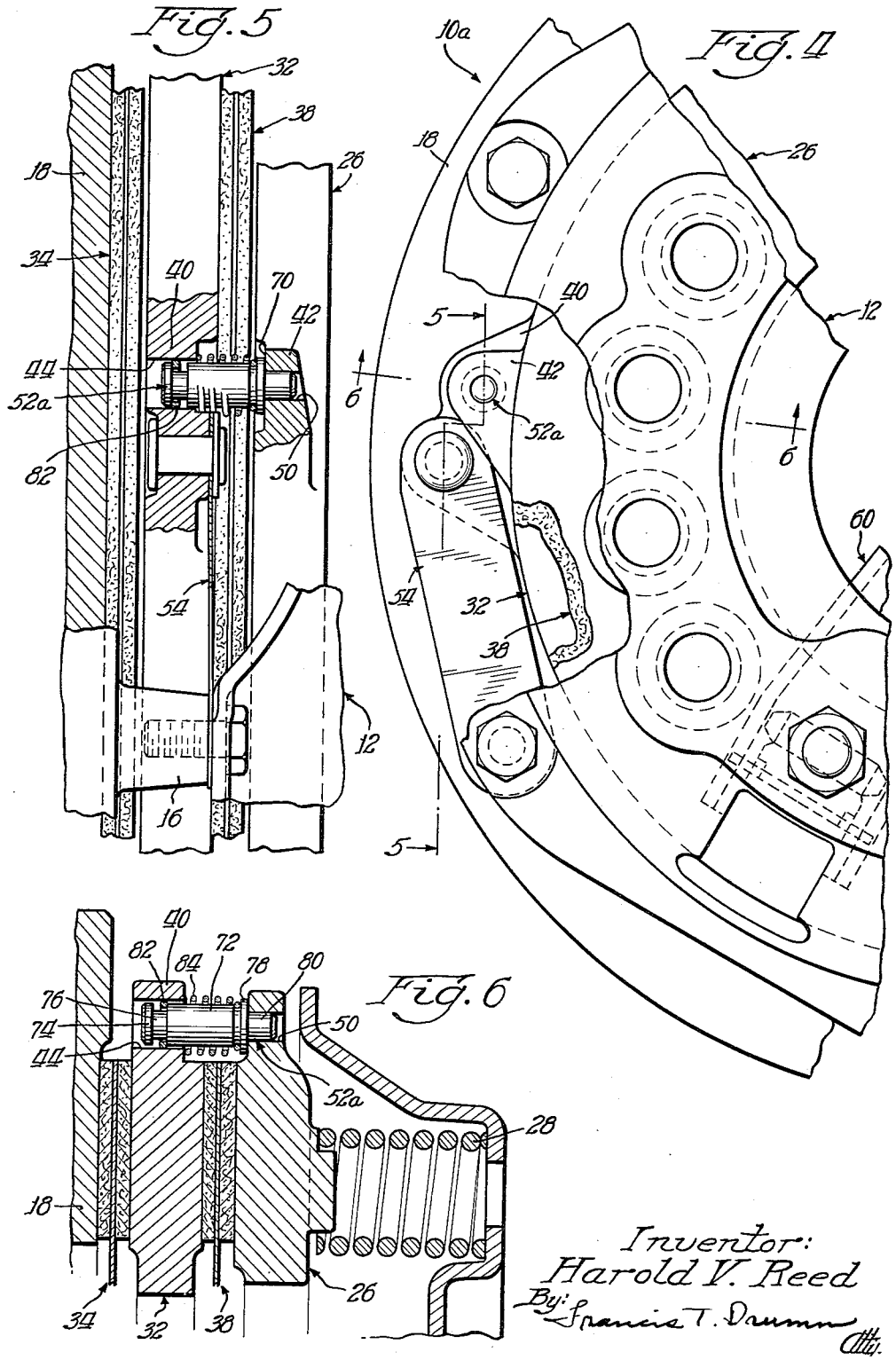

3,086,634
CLUTCHES
Harold V. Reed, Chicago, Ill., assignor to Borg-Warner
Corporation, Chicago, Ill., a corporation of Illinois
Filed Oct. 16, 1959, Ser. No. 846,942
1 Claim. (Cl. 192—111)

This invention relates to clutches and more particularly to a clutch for automotive vehicles having a plurality of driven plates.

This invention is primarily directed to an automotive clutch having a pair of axially spaced pressure plates and a pair of axially spaced driven plates in which means are provided for positioning one of the pressure plates with respect to the other of the pressure plates when the clutch is disengaged. Heretofore, difficulty has been experienced in plates of this type in releasing the inner of two pressure plates upon disengagement of the clutch. Commonly, the secondary pressure plate was driven by pins from the main pressure plate and the secondary pressure plate had a tendency to hang up on these drive pins, thus impairing the release of the forward driven plate. Furthermore, clutches of this type tended to lag upon engagement because of the fact that the friction surfaces of the driven plates wear.

Accordingly, a principal object of the invention is to provide a clutch of the mentioned type in which retraction of the secondary pressure plate and of the driven plates is assured and in which proper spacing of the secondary pressure plate with respect to the main pressure plate is assured at all times.

A further object of the invention is to provide a clutch of the stated type in which a strap drive is provided for the secondary pressure plate and in which the secondary pressure plate is urged towards the main pressure plate when the clutch is disengaged and in which the pins incrementally advance in the openings in the secondary pressure plate as wear occurs in the friction facings of the driven plates.

Another object of the invention is to provide a clutch in accordance with the preceding objects in which the space between the secondary pressure plate and the main pressure plate is progressively diminished as wear occurs.

A further object of the invention is to provide a clutch of the mentioned character in which a friction ring is urged into engagement with the wall of each of the openings in the secondary pressure plate by the drive pin and in which separation of the secondary pressure plate from the driven plate interposed between the secondary pressure plate and the main pressure plate is afforded by a spring surrounding each of the pins.

Another object of the invention is to provide a clutch of the type described in which the pins frictionally engage the walls of the openings in the secondary pressure plate and advance within the openings, as required.

This invention consists of the novel constructions, arrangements and devices to be hereinafter described and claimed for carrying out the above stated objects and such other objects as will be apparent from the following description of preferred forms of the invention, illustrated with reference to the accompanying drawings, wherein:

FIGURE 1 is a fragmentary elevational view, partly in section, of a clutch made in accordance with the present invention;

FIGURE 2 is an enlarged elevational sectional view taken substantially on line 2—2 of FIGURE 1;

FIGURE 3 is an enlarged fragmentary detailed view taken substantially on line 3—3 of FIGURE 1;

FIGURE 4 is a view similar to FIGURE 1 but showing a modified form of the present invention;

FIGURE 5 is an enlarged elevational sectional view taken substantially on line 5—5 of FIGURE 4; and FIGURE 6 is a further enlarged fragmentary sectional view taken substantially on line 6—6.

Referring to the drawings and more particularly to FIGS. 1 and 2, the clutch assembly of the present invention is indicated generally by reference numeral 10 and comprises a cover plate 12 illustrated as being secured by means of a cap screw 14 to a plurality of circumferentially spaced bosses 16 integrally formed with a flywheel 18 and extending axially with respect to the axis of rotation of the cover plate 12.

The cover plate 12 is of the conventional annular construction and has a central opening 20 for reception of an output shaft (not shown). Also formed in the cover plate 12 are a plurality of openings 22 for reception of eyebolts 24. The inner end of the eyebolts 24 are received in circumferentially spaced openings in a main pressure plate 26 which is urged to the engaged position illustrated in FIGURE 3 by means of a plurality of circumferentially spaced coil springs 28 which are maintained in the position illustrated by a plurality of recesses 30 formed in the cover plate 12 and a plurality of circumferentially spaced bosses 31 formed in the confronting face of the main pressure plate 26. It will be appreciated that the pressure plate 26 is rotated by the cover plate 12 by means of the eyebolts 24.

Interposed between the main pressure plate 26 and the flywheel 18 is a secondary pressure plate 32 which, like the main pressure plate 26, is of annular construction. A first driven plate 34 is disposed between the flywheel 18 and the secondary pressure plate 32. The driven plate 34 is provided on each side at its outer marginal edge with annular friction facings 36. A secondary driven plate 38 is arranged between the secondary pressure plate 32 and the main pressure plate 26. Annular friction facings 39 are secured to each side of the driven plate 38 at the outer marginal edge of each side thereof. It will be understood that the driven plates 34 and 38 are connected to the output shaft in a manner conventional to two-plate clutches of this type. It will be apparent that the springs 28 not only bias the main pressure plate 26 into the engagement with the driven plate 38, but also forces the secondary pressure plate 32 into frictional engagement with the flywheel 18, thus, in the engaged position of the clutch, the driven plates 34 and 38 are locked in power transmitting relation so that a portion of the torque is transmitted through each of these driven plates.

For effecting driving of the secondary pressure plate 32, a plurality of circumferentially spaced bosses or lugs 40 are formed on the outer periphery of the pressure plate 32 and similarly a plurality of bosses or lugs 42 are formed on the outer periphery of the main pressure plate 26. Each of the bosses 40 is provided with a bore 44 and a counterbore 46 defining a shoulder 48. In like manner, each of the bosses or lugs 42 is formed with a bore 50. Each boss 40 is maintained in circumferential alignment with a corresponding boss 42 by means of a pin 52 one end of which is received in a bore 44 and the other end of which is received in a bore 50. Drive is imparted to the main pressure plate 26 by means of the eyebolts 24 and is in turn imparted to the secondary pressure plate 32 by means of a plurality of straps 54 each of which has one end apertured for a reception of a cap screw 14 and the other end apertured for reception of a rivet 56 which passes through a bore 58 in each of the bosses 40. As will be understood, the strap 54 also serves to maintain the pressure plate 32 in position.

The pressure plates 26 and 32 may be moved from the engaged position illustrated in FIGURE 3 to the disengaged position illustrated in FIGURE 2 by release means including a plurality of circumferentially spaced release assemblies 60, shown in FIGURE 1. These release assemblies 60 may be of conventional type and may include release levers 62 which are pivoted by means of a release bearing (not shown) about an eyebolt 24 for retraction of the main pressure plate 26, and the intermediate pressure plate 32, against the force of the springs 28.

According to the present invention, means are provided to assure movement of the plate 32 away from the driven plate 34 upon operation of the release assemblies 60. Each of the pins 52 is of tubular construction to afford a tight fit in its associated bore 50. The opposite end of each pin 52 is illustrated as being in limited spaced relation to the walls of the associated bore 44. Mounted on the left end of each pin 52, as illustrated in FIGURES 2 and 3, is a ring or annular member 68 which frictionally engages the outer periphery of the pin. Upon movement of the pressure plate 26 from the engaged position illustrated in FIGURE 3 to the disengaged position illustrated in FIGURE 2, the ring 68 is brought into abutment with the end of the strap 54 through which a pin 52 passes. Thus, the secondary pressure plate 32 is moved to the right, as viewed in the same figure, to assure release of the driven plate 34. The axial extent of the counterbore 46 is sufficient to assure a degree of lost motion which permits initial separation of the pressure plate 26 from the confronting friction surface 40, followed by subsequent release of the pressure plate 32 from the surrounding friction surfaces 36 and 39. The strap 54 and shoulder 48 together define a strap means for limiting the axial movement of the pressure plates relative to each other.

Upon wear of the friction surfaces 36 and 39 the rings 68 are moved to the right with respect to the pins 52, as viewed in FIGURE 2, and the pins 52 advance within the bores 44 as engagement occurs. The rings 68 assume new positions with respect to the pins 52 and effective release of the driven plates 34 and 38 is made possible even when the friction surfaces 36 and 39 are worn.

In FIGURE 5 is illustrated a modified form of the present invention, indicated generally by reference numeral 10a and comprising, as in the principal form of the invention, a flywheel 18 adapted to be rotated by a power source, a plurality of circumferentially spaced axially extending integrally formed bosses 16 projecting from the outer marginal edge of one side of the flywheel 18. Drive is transmitted from the flywheel 18 to the cover plate 12 by means of the bosses 16. The pressure plate 26 is shown as driven by a plurality of circumferentially spaced eyebolts 24, as in the principal form of the invention. So also, the driven plate 34 is interposed between the flywheel 18 and the secondary pressure plate 32; driven plate 38 is arranged between the pressure plate 32 and the pressure plate 26.

In this modified form of the invention, however, release of the driven plates is assured by a plurality of positioning assemblies 69, only one of which is shown. Each of the bosses 42 at the outer periphery of the pressure plate 26 is formed with a recess 70. In lieu of the pins 52, a pin 52a extends between the bore 50 of each boss 42 and the bore 44 of each boss 40. As shown best in FIGURES 5 and 6, each pin 52a includes a body portion 72, a head portion 74 spaced from the body portion 72 by means of an annular recess 76, a radially outwardly extending flange 78 and a reduced end portion 80. As illustrated, the end portion 80 is received in the bore 50 while the head portion 74 is received in the bore 44. Received within the recess 76 is a friction ring 82 which normally bears against the wall of the bore 44. The pressure plate 32 is normally urged to the left as viewed in FIGURES 5 and 6, by means of a helical coil spring 84, one end of which abuts against the flange 78 and the other end of which abuts against the confronting surface of the pressure plate 32. This relative movement of the pressure plates 32 and 26 is made possible by the lost motion afforded by the axial elongation of the recess 76. When wear inevitably occurs on the friction surfaces 36 and 39, each pin 52a incrementally advances in its associated bore 44 and thus the friction ring 82 is advanced by the body portion 72 to a new position. It will be appreciated that the groove 76 is axially elongated to afford a limited range of movement of the pressure plate 32 as provided by spring 84 in the disengaged position of the clutch and the spring 28 in the engaged position of the clutch. Thus, the relative movement between the pressure plate 32 and the pressure plate 26 remains substantially the same under all conditions.

The clutch of the above described invention exhibits important advantages over clutches heretofore known. For instance, the release of the inner driven plate 34 is assured at all times because of the controlled movement of the secondary pressure plate 32 under the influence of the primary pressure plate 26. When the friction surfaces 36 and 40 are new, the pressure plate 32 may be moved from the engaged position illustrated in FIGURE 6 to the disengaged position illustrated in FIGURE 5 by means of the force exerted against the friction ring 82 by means of the head 74 of the pin 52a, against the force of the spring 84. So also, disengagement of the pressure plate 32 from the driven plate 38 is assured by the force exerted by the springs 84. The axially elongated recess 76 and the friction ring 82 provide a lost motion connection between the two pressure plates which frictionally limits the range of movement. As previously explained, the range of relative movement remains the same under conditions of wear as the movement zone advances with respect to the wall of each bore 44.

While I have described my invention in connection with specific constructions and arrangements, it is to be understood that this is by way of illustration and not by way of limitation and the scope of my invention is defined solely by the appended claim which should be construed as broadly as the prior art will permit.

I claim:

The combination comprising: a flywheel means; a pair of spaced pressure plates adjacent said flywheel means and being in axial alignment with each other and with said flywheel, said pressure plates each having a plurality of circumferentially spaced and correspondingly aligned openings generally at the outer periphery thereof; a plurality of straps drivingly connecting one of said pressure plates to said flywheel means, each of said straps having one end fixed to said one pressure plate and having a portion of said one end formed with an opening therethrough in axial alignment with a pair of said aligned openings in said pressure plates; a pair of driven plates in axial alignment with said flywheel means and pressure plates and interposed therebetween so that one driven plate separates the pressure plates and the other driven plates separates the flywheel means and adjacent pressure plate; means for axially moving said pressure and driven plates so that they may be moved into and out of frictional series engagement with each other to provide a drive between said flywheel means and said driven plates; and means connecting said pressure plates together whereby sequential disengagement of said pressure plates from said driven plates is assured, said connecting means comprising a plurality of solid cylindrical pins, each pin being received in aligned openings of said pressure plates and having one end frictionally secured to the sides of the opening in said one pressure plate to prevent relative movement therebetween during operation; an annular resilient member disposed about the other end of each pin and adapted to exert a predetermined frictional force against one of either the said other pressure plate or said other pin end; and means having stops disposed on opposite sides of said annular member and adapted to cooperate with said annular member for providing a lost motion connection between said pin and said other pressure plate in a manner so that upon the occurrence of wear between said plates the annular member will be caused to shift axially relative to the pin as urged by one of said stops, the margin of each said strap opening being closely adjacent to said pin outer surface to provide a stop of said stop means, said other pressure plate having an annular shoulder portion in spaced relation to said strap opening margin to provide another stop of said stop means, and said annular member being frictionally mounted upon said pin outer surface and being engaged therewith by frictional force which may be overcome by the engaging force of said combination whereby the annular member may be shifted axially to accommodate wearing of the plates resulting in a different position of said stop means relative to the pin.

References Cited in the file of this patent

UNITED STATES PATENTS

| | | |
|---|---|---|
| 2,270,467 | Nutt | Jan. 20, 1942 |
| 2,385,517 | Hunt | Sept. 25, 1945 |
| 2,808,917 | Harter | Oct. 8, 1957 |
| 2,827,142 | Aschauer | Mar. 18, 1958 |

FOREIGN PATENTS

| | | |
|---|---|---|
| 993,466 | France | July 25, 1951 |